US006212396B1

(12) United States Patent
Brown et al.

(10) Patent No.: US 6,212,396 B1
(45) Date of Patent: *Apr. 3, 2001

(54) GENERIC HANDSET PROGRAMMING AND CONFIGURATION

(75) Inventors: Paul Richard Brown; Leonard George Bleile, both of Calgary (CA)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,225

(22) Filed: Mar. 27, 1997

(51) Int. Cl.[7] ....................................... H04Q 7/20
(52) U.S. Cl. ........................... 455/464; 455/62; 455/450; 455/465; 455/513
(58) Field of Search ................................... 455/462, 463, 455/464, 465, 517, 426, 450, 451, 452, 453, 455, 516, 509, 512, 513, 514, 62

(56) References Cited

U.S. PATENT DOCUMENTS

| 4,155,040 | * | 5/1979 | Harmon et al. | 455/88 |
| 4,679,225 | | 7/1987 | Higashiyama | 379/62 |
| 4,700,375 | | 10/1987 | Reed | 379/61 |
| 5,044,010 | | 8/1991 | Frenkiel et al. | 379/61 |
| 5,418,839 | | 5/1995 | Knuth et al. | 379/61 |
| 5,428,669 | | 6/1995 | McCarthy | 379/61 |
| 5,509,047 | | 4/1996 | Uchikura | 379/58 |

FOREIGN PATENT DOCUMENTS

| 0 433 166 A2 | 6/1991 | (EP) | H04M/1/72 |
| 0 454 080 A2 | 10/1991 | (EP) | H04M/1/72 |
| 0 680 189 A2 | 11/1995 | (EP) | H04M/1/72 |
| 2 184 920 | 7/1987 | (GB) | H04Q/7/02 |

OTHER PUBLICATIONS

International Application Published Under the Patent Cooperation Treaty (PCT), Publication Number WO 95/19084, Publication Date Jul. 13, 1995. PCT International Application Serial No. PCT/US95/00065 filed Jan. 3, 1995. Title: Clear Channel Selection System for a Cordless Telephone. Applicant: Thomson Consumer Electronics, Inc.

* cited by examiner

*Primary Examiner*—Lee Nguyen
(74) *Attorney, Agent, or Firm*—Cobrin & Gittes

(57) ABSTRACT

A method and apparatus for controlling communications between a base and a handset capable of communicating with each other on at least one communication channel within a channel set. The method involves transmitting a new channel message including a preferred channel identifier from the base to the handset, on different channels of the channel set until an acknowledgement signal is received from the handset. In response to the acknowledgement signal, the preferred channel identifier is stored in a base working channel transmit buffer. Further communications between the base and the handset are conducted on a communications channel identified by the preferred channel identifier.

38 Claims, 18 Drawing Sheets

"Finding the Handset"

| | | | Message 0 | 1st Pass | 2nd Pass | After Message Handling Routine Successful Receipt | | After Handset Finding Alg Redundant | | Before Message Typ | After Message Typ |
|---|---|---|---|---|---|---|---|---|---|---|---|
| | A | B | C | D | E | F | G | H | I | J | K |
| Base: | | | | | | | | | | | |
| B-RAM: (32) | | | | | | | | | | | |
| B-Working Channel: Transmit (Tx) (54) | xx | 18 | 18 | 16 | 17 | 17 | 17 | 17 | 18 | 18 | 18 |
| B-Working Channel: Receive (Rx) (56) | xx | 18 | 18 | 18 | 18 | 18 | 18 | 18 | 18 | 18 | 18 |
| B-Working Channel: Security ID (58) | x | 1 | 1 | 0 | 0 | 0 | 0 | 0 | 1 | 1 | 1 |
| Transceiver Buffer: B/Rx Sec ID(62) | x | x | 1 | 0 | 0 | 0 | 0 | 0 | 1 | 1 | 1 |
| B/Rx Msg #(64) | x | x | 0 | 1 | 1 | 1 | 1 | 1 | 1 | 1 | 2 |
| B/RxData 0 | x | x | x | 18 | 18 | 18 | 18 | 18 | x | x | x |
| B/Rx Data 1 | x | x | x | 1 | 1 | 1 | 1 | 1 | x | x | x |
| B/Rx Data N | x | x | x | x | x | x | x | x | x | x | x |
| B/Rx CRC (68) | x | x | x | crc | crc | crc | crc | crc | crc | crc | crc |
| B-EEPROM: (34) | | | | | | | | | | | |
| B-StartupChannel (70) | 18 | 18 | 18 | 18 | 18 | 18 | 18 | 18 | 18 | 18 | 18 |
| B-Security ID (72) | 1 | 1 | 1 | 1 | 1 | 1 | 1 | 1 | 1 | 1 | 1 |
| B-Brandline Prompt (74) | ↓ | ↓ | ↓ | H | E | L | L | O | ↓ | ↓ | ↑ |

FIG. 13A

|  | A | B | C Mess-age 0 | D 1st Pass | E 2nd Pass | F | G | H | I | J | K |
|---|---|---|---|---|---|---|---|---|---|---|---|
| Handset: | | | | | | | | | | | |
| HS-RAM (232) | | | | | | | | | | | |
| HS-Working Channel: Transmit(Tx)(254) | x | 17 | 17 | 17 | 17 | 17 | 18 | 18 | 18 | 18 | 18 |
| HS-Working Channel: Receive (Rx) (256) | x | 17 | 17 | 17 | 17 | 17 | 18 | 18 | 18 | 18 | 18 |
| HS-Working Channel Security ID (258) | x | 2 | 2 | 2 | 2 | 2 | 1 | 1 | 1 | 1 | 1 |
| Transceiver Buffer: HS/Rx Sec ID (262) | x | x | x | x | x | 0 | 1 | 1 | 1 | 1 | 1 |
| HS/Rx Msg # (264) | x | x | x | x | x | 1 | 1(2) | 1(2) | 1(2) | 2 | 2 |
| HS/Rx Data 0) | x | x | x | x | x | 18 | x | x | x | x | x |
| HS/Rx Data 1)(266) | x | x | x | x | x | x | x | x | x | x | x |
| HS/Rx Data N) | x | x | x | x | x | x | x | x | x | x | x |
| HS/Rx CRC (268) | x | x | x | x | x | crc | crc | crc | crc | crc | crc |
| HS-EEPROM (234) | | | | | | | | | | | |
| HS-StartupChannel (270) | 17 | 17 | 17 | 17 | 17 | 17 | 18 | 18 | 18 | 18 | 18 |
| HS-Security ID (272) | 2 | 2 | 2 | 2 | 2 | 2 | 1 | 1 | 1 | 1 | 1 |
| HS-Brandline Prompt (274) | → | → | G | O | O | D | B | Y | E | → | → |

FIG. 13B

"First Contact"

Base:

| | Before Block 350 in Fig. 12 | After Block 350 in Fig. 12 |
|---|---|---|
| | L | M |
| B-RAM: | | |
| B-Working Channel: Transmit (Tx) | | 18 |
| B-Working Channel: Receive (Rx) | | 18 |
| B-Working Security ID | | 1 |
| Transceiver Buffer: B-Rx Sec ID | 1 | 1 |
| B-Rx Msg # | 3 | 3 |
| B-RxData 0 | H | H |
| B-RxData 1 | e | e |
| ... | ... | ... |
| B-Rx Data N | o | o |
| B-Rx CRC | crc | crc |
| B-EEPROM: | | |
| B-StartupChannel | 18 | 18 |
| B-Security ID | 1 | 1 |
| B-Brandline Prompt | Hello | Hello |

FIG. 14A

| Handset: | Before Block 350 in Fig. 12 | After Block 350 in Fig. 12 |
|---|---|---|
| | L | M |
| HS-RAM | | |
| HS-Working Channel: Transmit(Tx) | 18 | 18 |
| HS-Working Channel: Receive (Rx) | 18 | 18 |
| HS-Working Security ID | 1 | 1 |
| Transceiver Buffer: HS-Rx Sec ID | x | 1 |
| HS-Rx Msg # | x | 3 |
| HS-Rx Data 0 | x | H |
| HS-Rx Data 1 | x | e |
| ... | ... | ... |
| HS-Rx Data N | x | o |
| HS-Rx CRC | x | crc |
| HS-EEPROM: | | |
| HS-StartupChannel | 18 | 18 |
| HS-Security ID | 1 | 1 |
| HS-Brandline Prompt | Goodbye | Goodbye |

FIG. 14B

"In-cradle Scan"

| | N | O | P | Q | R | S | T |
|---|---|---|---|---|---|---|---|
| Base: | | | | | | | |
| B-RAM: | | | | | | | |
| B-Working Channel: Transmit (Tx) | 18 | 18 | 18 | 18 | 18 | 18 | |
| B-Working Channel: Receive (Rx) | 18 | 16 17 18 19 20 21 22 23 24 25 | 23 | 23 | 23 | 23 | 23 |
| B-Working Security ID | 1 | 1 | 1 | 1 | 1 | 1 | 1 |
| Transceiver Buffer:  B-Rx Sec ID | x | | x | 1 | 1 | 1 | x |
| B-Rx Msg # | x | | x | 1 | 1 | 1 | x |
| B-RxData 0 | x | | x | 23 | 23 | 23 | x |
| B-Rx Data 1 | x | | x | 1 | 1 | 1 | x |
| ... | | | | | | | |
| B-Rx Data N | x | | x | x | x | x | x |
| B-Rx CRC | x | | x | crc | crc | crc | x |
| B-EEPROM: | | | | | | | |
| B-StartupChannel | 18 | 18 | 18 | 18 | 18 | 18 | 18 |
| B-Security ID | 1 | 1 | 1 | 1 | 1 | 1 | 1 |
| B-Brandline Prompt | Hello | Hello | Hello | Hello | Hello | Hello | Hello |

FIG. 15A

"In-cradle Scan"

| | N | O | P | Q | R | S | T |
|---|---|---|---|---|---|---|---|
| Handset: | | | | | | | |
| HS-RAM | | | | | | | |
| HS-Working Channel: Transmit(Tx) | 18 | 18 | 18 | 18 | 18 | 23 | 23 |
| HS-Working Channel: Receive (Rx) | 18 | 18 | 18 | 18 | 18 | 23 | 23 |
| HS-Working Security ID | 1 | 1 | 1 | 1 | 1 | 1 | 1 |
| Transceiver Buffer: HS-Rx Sec ID | x | x | x | x | 1 | x | x |
| HS-Rx Msg # | x | x | x | x | 1 | x | x |
| HS-Rx Data 0 | x | x | x | x | 23 | x | x |
| HS-Rx Data 1 | x | x | x | x | 1 | x | x |
| HS-Rx Data N | x | x | x | x | x | x | x |
| HS-Rx CRC | | | | | crc | x | x |
| HS-EEPROM: | | | | | | | |
| HS-StartupChannel | 18 | 18 | 18 | 18 | 18 | 18 | 18 |
| HS-Security ID | 1 | 1 | 1 | 1 | 1 | 1 | 1 |
| HS-Brandline Prompt | Hello | Hello | Hello | Hello | Hello | Hello | Hello |

FIG. 15B

GENERIC HANDSET PROGRAMMING AND CONFIGURATION

BACKGROUND OF THE INVENTION

This invention relates to cordless telephones, and more particularly, to providing a telephone with an initial set of communications parameters at the time of manufacture and for providing provisions for changing communications parameters when the cordless telephone is placed in service or is already in service.

Cordless telephones normally include a base station and a handset which communicate over a radio frequency communications channel. Federal regulations provide for such communications to be carried out on any of a set of predefined channels. There are different bands of channels available for cordless telephone use. A band known as the CTO band includes 25 channel pairs, designated channels 1–25. Of these, only channels 16–25 can be used without first monitoring to check whether the channel is occupied. Most 25-channel CTO cordless telephones therefore start their communications on one of the channel pairs. In addition, cordless telephone manufacturers have implemented a security code feature in which a security code is included in transmissions between the base station and the handset to distinguish one call from another on the same communications channel. The communications channel and security code will hereinafter be referred to as communication parameters.

In addition to the aforementioned communication parameters, some applications of cordless telephones are preferably provided with brand line prompt information so that a user can observe on a display on the telephone, a prompt, indicative of the service provider and the like.

Normally, cordless telephones are manufactured with preprogrammed communications default parameters including initial channel selections. However, in order for a base and a handset to communicate with each other, they both must be programmed to communicate on the same channel. This requires that the base be matched to the handset at the time of shipping to ensure both are programmed appropriately. This increases the cost of production and forces the user to purchase a new base and a new handset in the event that one or the other must be replaced.

Another problem which occurs in cordless telephones is interference due to neighbouring telephones or other radio frequency equipment. When such interference occurs on a given channel, it is desirable to change the programming in the base and handset to cause the base and handset to communicate on a different channel.

It would be desirable if a base/handset pair could automatically locate a channel with a minimum amount of background noise and automatically program the base and handset to communicate on such channel.

BRIEF SUMMARY OF THE INVENTION

In accordance with one aspect of the invention, there is provided a base apparatus of a cordless telephone. The base apparatus is operable to communicate with a handset of the cordless telephone on at least one communications channel within a channel set. The base apparatus includes a receiver for receiving signals from the handset and a transmitter for transmitting signals from the base to the handset. The base apparatus further includes a base working channel transmit buffer for storing a transmit channel indicator defining a channel on which the transmitter transmits signals. It further includes a base processor in communication with the receiver, the transmitter and the base working channel transmit buffer. The base processor is programmed to i) produce a first new channel message including a preferred channel identifier, ii) direct the transmitter to transmit the first new channel message in the signals transmitted from the base to the handset, on a channel defined by the contents of the base working channel transmit buffer, iii) successively load the base working channel transmit buffer with channel indicators corresponding to different channels within the channel set such that the first new channel message is successively transmitted on different channels, iv) receive an acknowledgment signal from the receiver when an acknowledgment signal is received from the handset and v) in response to the acknowledgement signal from the receiver, maintain in the base working channel transmit buffer a channel indicator associated with a last channel on which the message was transmitted immediately before the acknowledgment signal was received such that further communications between the base and the handset are conducted on the last channel.

Preferably, the base apparatus has a connector for supplying a charge current to the handset and includes a current sensor for measuring the charge current and for providing to the base processor a current detect signal which is rendered active when charge current exceeds a predefined value.

Preferably, the base processor is programmed to perform the step of successively loading the base working channel transmit buffer when the current detect signal is active.

Preferably, the base apparatus includes non-volatile memory for storing the preferred channel identifier.

Preferably, the base apparatus includes a power-up detection circuit for detecting and indicating to the base processor a power-up condition of the base.

Preferably, the base apparatus includes a base working channel receive buffer and preferably the base processor is programmed to copy the preferred channel identifier from the non-volatile memory to the base working channel transmit buffer and the base working channel receive buffer in response to the power-up condition.

Preferably, the base processor is programmed to transmit to the handset a prompt message including a prompt code associated with a prompt to be displayed on the handset for viewing by the user.

Preferably, the apparatus includes non-volatile memory for storing the prompt code.

Preferably, the base processor is programmed to direct the transmitter to transmit a wake-up message to the handset on a communications channel identified by the preferred channel identifier, prior to transmitting the first new channel message and is programmed to wait for a wake-up message acknowledgement signal from the handset and in response to the wake-up message acknowledgement signal, to maintain in the base working channel transmit buffer the transmit channel indicator identifying the channel on which the wake-up message was transmitted to the handset.

Preferably, the base receiver is operable to measure noise on at least some channels of the channel set and to provide to the base processor an indication of measured noise on each channel and preferably the base processor is programmed to receive the indication of measured noise on each channel and to identify the channel having the least measured noise.

Preferably, the base processor is programmed to direct the transmitter to transmit a second new channel message from the base to the handset, the second new channel message including a second new channel identifier identifying the channel with the least measured noise, such that further communications between the base and the handset are conducted on the channel with the least measured noise.

In accordance with another aspect of the invention, there is provided a handset apparatus operable to communicate with a base on at least one communications channel within a channel set. The handset apparatus includes a receiver for receiving signals from the base, a transmitter for transmitting signals to the base, and a handset working channel receive buffer for storing a receive channel indicator defining a channel on which the receiver receives signals. The handset further includes a handset processor in communication with the receiver, the transmitter and the handset working channel receive buffer. The handset processor is programmed to direct the receiver to receive a first new channel message including a preferred channel identifier, on at least one channel in the channel set and to direct the receiver to conduct subsequent communications with the base on a channel identified by the preferred channel identifier.

Preferably, the handset processor is further programmed to direct the transmitter to transmit to the base an acknowledgement signal in response to receiving the first new channel message.

Preferably, the handset acknowledgement signal is transmitted to the base on the channel identified by the preferred channel identifier.

Preferably, the handset apparatus includes non-volatile memory in the handset for storing the preferred channel identifier and the non-volatile memory is pre-programmed with an initial preferred channel identifier, identifying at least one channel in the channel set.

In addition, the handset processor is programmed to receive the first new channel message on a channel identified by the initial preferred channel identifier stored in the nonvolatile memory, upon powering up the handset.

Preferably, the handset apparatus includes a receive buffer for storing the first new channel message when the first new channel message is received.

Preferably, the handset apparatus includes a handset working channel transmit buffer for storing a transmit channel identifier identifying a channel on which the transmitter is to transmit signals to the base.

Preferably, the handset processor is programmed to copy the preferred channel identifier from the receive buffer to the handset working channel transmit buffer, to the handset working channel receive buffer and to the non-volatile memory.

Preferably, the receiver is operable to receive a security ID code in the first new channel message and the apparatus includes a working channel security ID buffer for holding a working channel security ID value.

Preferably, the working channel security ID value is stored in non-volatile memory.

Preferably, the handset processor is operable to compare the security ID code with a default value and the contents of the working channel security ID buffer and if the security ID code is not equal to the default value or the contents of the working channel security ID buffer, to disable the transmission of the acknowledgement signal to the base.

Preferably, the contents of the working channel security ID buffer are replaced with the security ID code in the first new channel message when the security ID code in the message is equal to the default value.

Preferably, the apparatus includes an in-cradle sensor for sensing whether or not the handset is in the cradle and the handset processor is programmed to replace the contents of the working channel security ID buffer when the handset is in the cradle. Preferably, the handset has charging terminals for receiving a charging current from the base and preferably, the in-cradle sensor includes a voltage sensing circuit for sensing voltage across the charging terminals.

Preferably, the receiver provides to the microprocessor a signal indicating signal strength of the signal received from the base and preferably, the microprocessor replaces the contents of the working channel security ID buffer when the signal strength is greater than a pre-defined value.

In accordance with another aspect of the invention, there is provided a method of controlling communications between a base and a handset capable of communicating with each other on at least one communication channel within a channel set. The method includes the steps of: i) transmitting from the base to the handset, a new channel message including a preferred channel identifier, on different channels of the channel set until an acknowledgement signal is received from the handset, ii) in response to the acknowledgement signal, storing in a base working channel transmit buffer, the preferred channel identifier, and iii) conducting further communications between the base and the handset on a communications channel identified by the preferred channel identifier.

In addition, the method includes the step of determining whether or not the handset is connected to the base and performing the steps above when the handset is connected to the base.

Preferably, the method includes the step of measuring charge current from the base to the handset and when the charge current exceeds a pre-defined value, rendering active a signal indicating the handset is connected to the base.

Preferably, the method includes the step of storing the preferred channel identifier in non-volatile memory in the base.

Preferably, the method includes the step of detecting a power-up condition of the base and copying the preferred channel identifier from the non-volatile memory to a base working channel transmit buffer and a base working channel receive buffer.

Preferably, the method includes the step of transmitting to the handset a prompt message including a prompt code associated with a prompt to be displayed on the handset for viewing by the user. In addition, the method includes the step of receiving the prompt message at the handset and displaying the prompt associated with the prompt code for viewing by the user.

Preferably, the method includes the step of storing the prompt code in non-volatile memory in the handset and base.

Preferably, the method further includes the steps of: i) transmitting from the base, a wake-up message on a communications channel identified by the preferred channel identifier, ii) waiting for a wake-up message acknowledgement signal from the handset and iii) in response to the wake-up message acknowledgement signal, omitting the step of transmitting from the base to the handset the new channel message on different channels of the channel set.

Preferably, the method includes the step of receiving at the handset the new channel message on at least one communication channel within the channel set. In addition, when the new channel message is received at the handset it is preferable that the handset is configured to use the channel identified by the preferred channel identifier for communications between the handset and the base.

Preferably, the method includes the step of storing the preferred channel identifier in non-volatile memory in the handset.

In addition, the method preferably includes the step of transmitting the acknowledgement signal on the communications channel identified by the preferred channel identifier when the new channel message is successfully received by the handset.

Preferably, the method includes the step of storing the new channel message in a receive buffer.

Preferably, the method includes the step of copying the preferred channel identifier from the receive buffer to a handset working channel transmit buffer and a handset working channel receive buffer and transmitting and receiving all messages from the base on a channel specified by the contents of the handset working channel transmit buffer and the handset working channel receive buffer respectively.

In accordance with another aspect of the invention, a method of reducing interference in radio frequency communications between a base and a handset capable of communicating with each other on at least one communications channel within a channel set, includes the steps of: i) measuring noise on each channel of the channel set, ii) determining which of the channels has the least measured noise, iii) transmitting a new channel message from the base to the handset, the new channel message including a new channel identifier for identifying the channel with the least measured noise, and iv) conducting further communications between the base and the handset on the channel with the least measured noise.

Preferably, the method includes the steps of receiving the new channel message at the handset and configuring the handset to conduct further communications between the base and the handset on the channel with the least measured noise.

Preferably, the step of configuring includes the step of extracting the new channel identifier from the new channel message and copying the new channel identifier to a handset working channel transmit buffer and to a handset working channel receive buffer in the handset.

In addition, the method preferably includes the step of conducting further communications between the base and the handset on the channel with the least measured noise as identified by the new channel identifier stored in the handset working channel transmit buffer and the handset working channel receive buffer respectively.

Preferably, the method includes the step of storing the new channel identifier in non-volatile memory in the handset.

Preferably, the method includes the steps of storing the new channel identifier in the base working channel receive buffer prior to transmitting the new channel message to the handset and receiving subsequent messages transmitted by the base on a channel identified by the new channel identifier stored in the base working channel receive buffer.

Preferably, the method includes the steps of waiting for an acknowledgement signal from the handset and when the acknowledgement signal is received, storing the new channel identifier in a base working channel transmit buffer and transmitting to the handset on a channel identified by the new channel identifier stored in the base working channel transmit buffer.

In accordance with another aspect of the invention there is provided a method of matching a handset to a base station in a wireless telephone system, the method including the steps of: i) transmitting programming information from the base station on channels selected from a set of pre-defined channels, ii) receiving the programming information at the handset, on at least one of the channels, iii) transmitting an acknowledgement signal from the handset to the base station on at least one of the channels, and iv) reconfiguring the handset to communicate with the base station according to the programming information.

BRIEF DESCRIPTION OF THE SEVERAL VIEWS OF THE DRAWING

In drawings which illustrate embodiments of the invention,

FIGS. 13A and 13B depict a table indicating the states of various buffers at various stages during the above-mentioned algorithms;

FIGS. 14A and 14B depict a table indicating the contents of buffers in the base and handset microprocessor circuits before and after the algorithm of FIG. 12 is completed; and FIGS. 15A and 15B depict a table indicating the contents of buffers at various stages in the in-cradle scan algorithm shown in FIG. 11.

DETAILED DESCRIPTION

Figure 1:
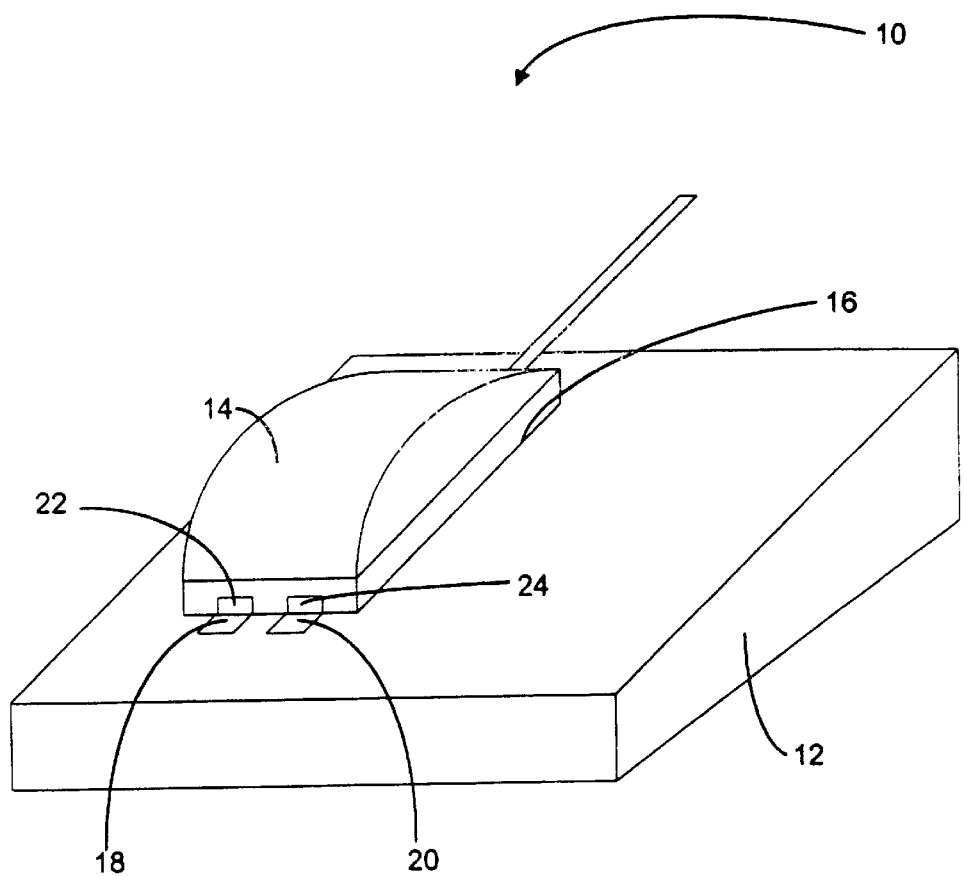
FIG. 1 is an isometric view of an apparatus according to a first embodiment of invention.

Referring to FIG. 1, a cordless telephone apparatus according to a first embodiment of the invention is shown generally at 10. The apparatus includes a base 12 and a handset 14. The base 12 has a handset cradle 16 having first and second contacts 18 and 20 operable to supply power to corresponding third and fourth contacts 22 and 24 respectively on the handset, when the handset is in the cradle 16.

Figure 2:
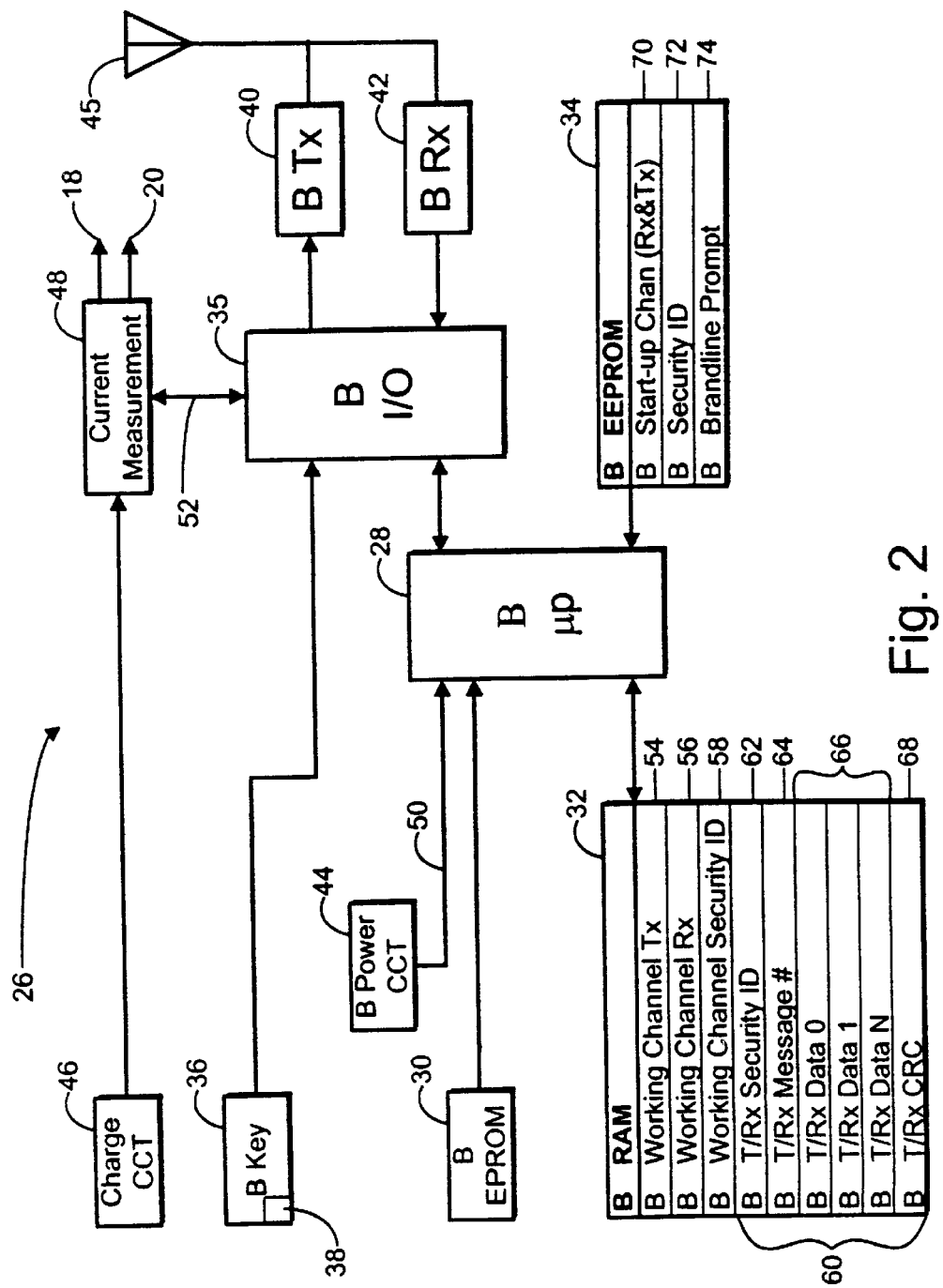
FIG. 2 is a block diagram of a base microprocessor circuit according to the first embodiment of the invention.

Referring to FIG. 2, the base includes a base microprocessor circuit shown generally at 26. The base microprocessor circuit 26 includes a base microprocessor 28 to which is connected a base electrically programmable read only memory (EPROM) 30, random access memory (RAM) 32, electrically erasable programmable read only memory (EEPROM) 34 and a base input/output (I/O) port 35. Similar components are included in the handset (14 shown in FIG. 1) and therefore, the names for these components in FIG. 2 are preceded with a "B" to indicate that these components are located in the base.

Still referring to FIG. 2, the base microprocessor circuit 26 further includes a base keyboard 36, which in this embodiment, includes a conventional telephone dial pad and a user-operable scan key 38. The base microprocessor circuit 26 further includes a base transmitter circuit 40, a base receiver circuit 42, a base power circuit 44, a charge circuit 46 and a power measurement circuit 48.

The base keyboard 36 is connected to the base I/O port 35 and is operable by the user to provide to the base I/O port 35 signals indicative of a key actuated on the keypad or to indicate actuation of the scan key 38.

The base transmitter circuit 40 and base receiver circuit 42 are operable to provide and receive radio frequency (RF) signals to and from an antenna 45, for communication with the handset (14 shown in FIG. 1). The transmitter and receiver circuits are conventional. The base transmitter circuit 40 is operable to provide modulation to a carrier frequency which it generates, in response to data written to the base I/O port 35 by the base microprocessor 28. Similarly, the base receiver circuit 42 is operable to demodulate RF signals received at the antenna 45 and to provide to the base I/O port 35 data indicative of the demodulated signal so produced. The base microprocessor 28 is operable to read this data from the base I/O port 35 in the conventional manner. Thus, the base microprocessor 28 is in communication with the base receiver circuit 42 and the base transmitter circuit 40.

The base power circuit 44 is conventional and provides to the base microprocessor 28 a power-up reset signal 50 to indicate to the base microprocessor 28 a condition where the base microprocessor 28 is changed from an off state to an on state. The base power circuit 44 thus acts as a power-up detection circuit for detecting and indicating to the base microprocessor a power-up condition of the base microprocessor circuit 26.

The charge circuit 46 provides a charge current to the first and second contacts 18 and 20 for charging a battery in the handset. The power measurement circuit 48 acts as a current sensor and measures the charge current supplied to the handset via the first and second contacts 18 and 20 and provides a current detect signal 52 to the base I/O port 35, the current detect signal 52 being rendered active when the current supplied to the handset is greater than a pre-defined value. Referring to FIGS. 1 and 2, it will be appreciated that when the handset is in the cradle, its battery will draw some charging current and therefore when the current detect signal 52 is active it may be interpreted as indicating that the handset is in the cradle.

The base RAM 32 is used for conventional data storage for functions performed by the base microprocessor 28 in accordance with conventional algorithms to effect conventional telephone functions such as ringing, audio communication, call display, etc. The base RAM 32 however further includes dedicated registers which act as buffers including a base working channel transmit buffer 54, a base working channel receive buffer 56, a base working channel security identification (ID) buffer 58, and a base transceiver buffer shown generally at 60. The base transceiver buffer 60 includes a base transceiver security ID buffer 62, a base transceiver message number buffer 64, base transceiver payload buffers 0–N 66, and a base transceiver cyclic redundancy check (CRC) buffer 68. In addition, the base EEPROM 34 includes a base startup channel buffer 70, a base security ID buffer 72 and a base brandline prompt buffer 74. Generally, the base working channel buffers 54–58 are used to hold communications parameters including identifications of the transmit and receive channels the base is to use for communication with the handset and an identification of the security ID code to be used in communications with the handset. The base microprocessor 28 is, of course, in communication with the base working channel buffers 54–58. The base transceiver buffers 60 are used to hold messages to be sent to the handset and messages received from the handset. The buffers 70–74 in the base EEPROM 34 are used to store default values used on powering up the base.

The base EPROM 30 is used to store programming instructions operable to direct the base microprocessor 28 to perform all functions including conventional telephone functions and functions according to this embodiment of the invention as will be described herein.

Figure 3:
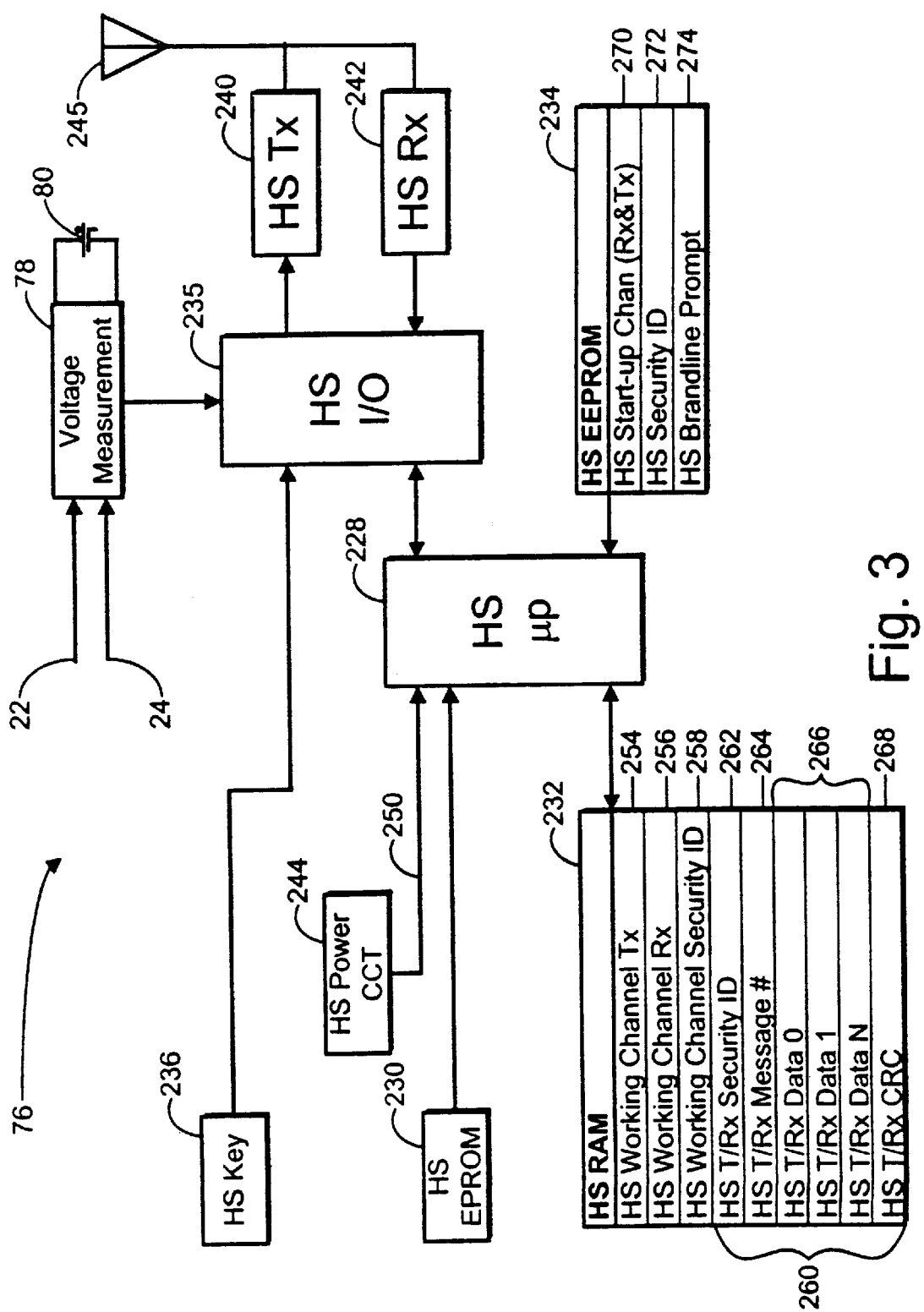
FIG. 3 is a block diagram of a handset microprocessor circuit according to the first embodiment of the invention.

Referring to FIG. 3, the handset includes a handset microprocessor circuit 76 having components similar to the base microprocessor circuit 26 (shown in FIG. 2). Therefore, in FIG. 3, the names of components of the handset microprocessor circuit 76 which have corresponding names in the base microprocessor circuit are identified by the prefix "HS" to designate that the component is in the handset. In addition, reference numerals of components of the handset microprocessor circuit 76 corresponding to components of the base microprocessor circuit are designated by the same reference numerals but include the prefix "2". The handset microprocessor circuit 76 differs from the base microprocessor circuit (26 shown in FIG. 2) in that it includes the third and fourth contacts 22 and 24 which are connected to a voltage measurement circuit 78 which measures voltage across the third and fourth contacts 22 and 24 and provides a digital value to the HS I/O port 235 indicative of the voltage measured.

In addition, the handset receiver 242 is operable to provide to the handset microprocessor 228 a number indicating the signal strength of the signal received at the antenna.

Operation

The operation of the telephone apparatus is described in connection with FIGS. 4–15. The buffers of the base RAM 32, base EEPROM 34, handset RAM 232 and handset EEPROM 234 FIGS. 2 and 3 are referenced in a tabular form in FIGS. 13–15 so the reader will readily appreciate how the contents of respective buffers are changed by the base and handset microprocessors.

Referring to FIG. 2, the base EPROM 30 is programmed with blocks of instruction codes operable to direct the base microprocessor 28 to execute respective functional blocks of a first initialization algorithm, a handset finding algorithm, a receive algorithm, a message "2" handling algorithm, a brandline prompt algorithm, and an in-cradle scan algorithm, described by flowcharts shown in FIGS. 4, 6, 7, 8, 9, and 11 respectively. Specific codes stored in the base EPROM 30 to implement these algorithms will be ascertainable by one of ordinary skill in the art, with reference to a list of codes and associated functionality specific to the base microprocessor. Such codes are provided in a programming manual available from the manufacturer of the microprocessor. In this embodiment, the base microprocessor 28 is a Motorola MC68HC705LN56.

Figure 5:
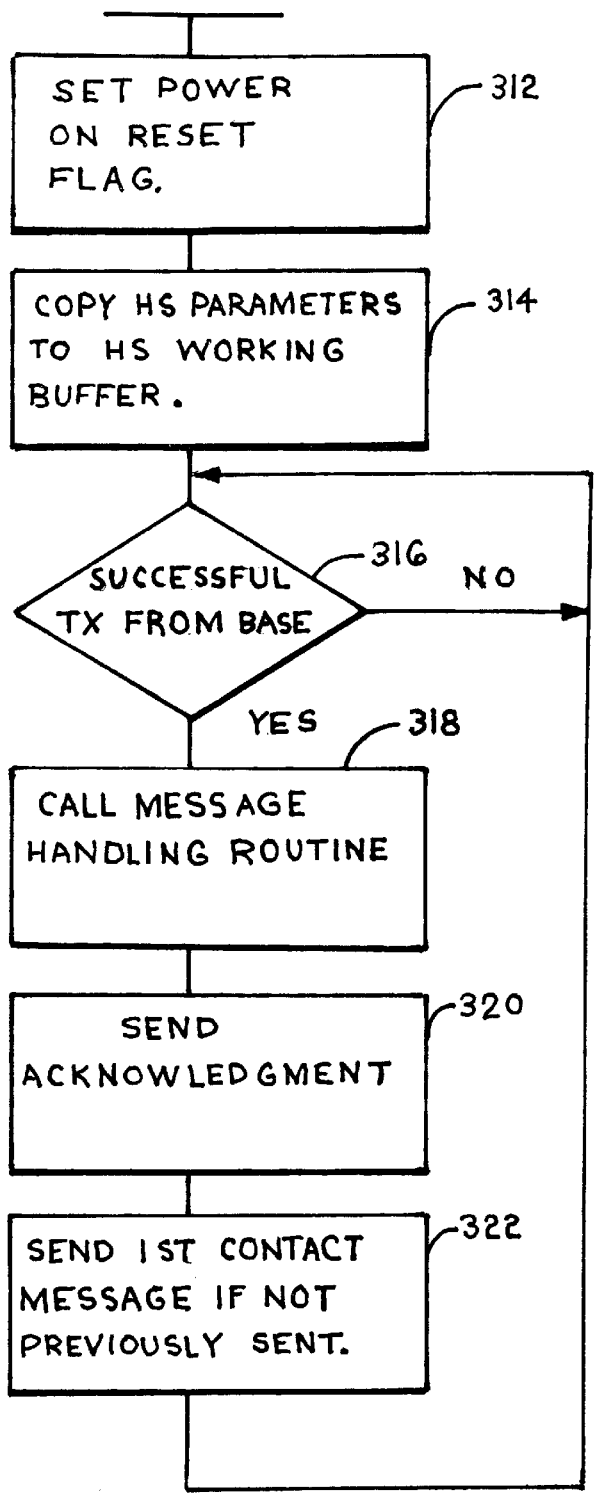
FIG. 5 is a flowchart depicting a second initialization algorithm handset according to the first embodiment of the invention.
Figure 10:
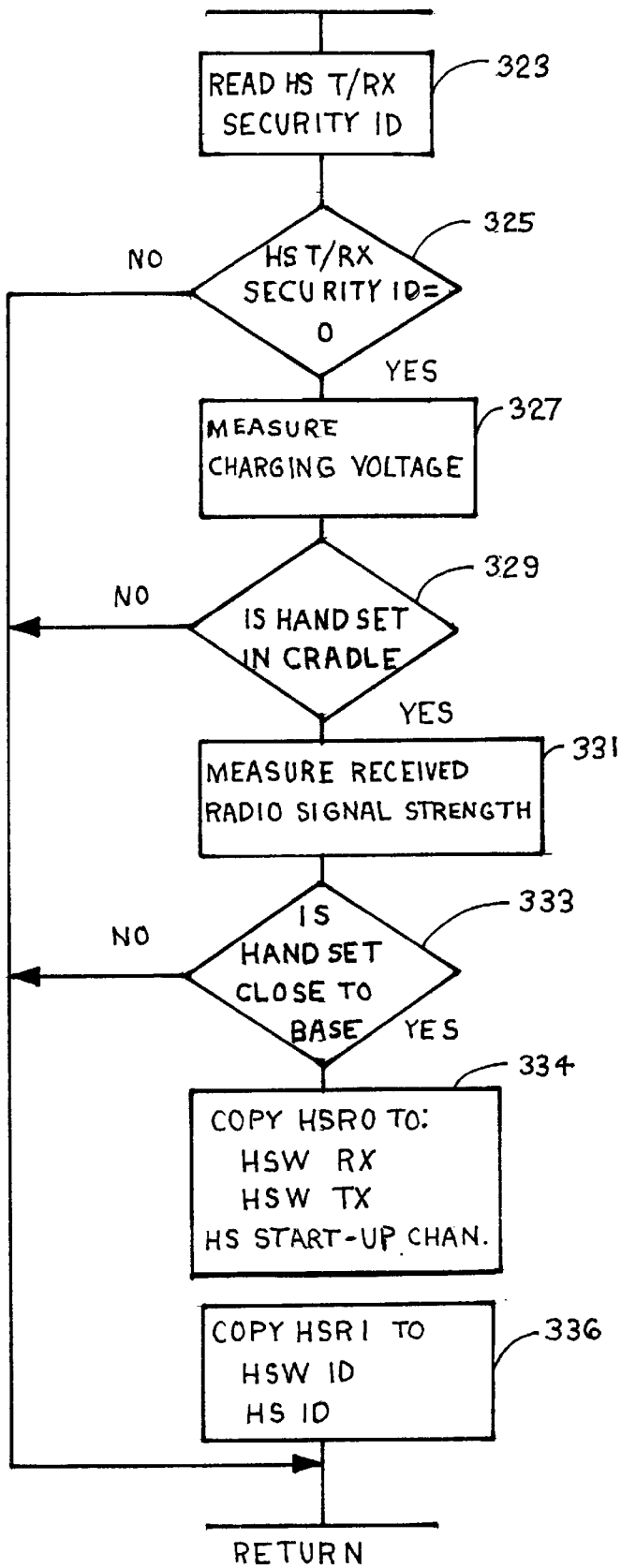
FIG. 10 is a flowchart depicting a message 1 handling algorithm handset according to the first embodiment of the invention.
Figure 12:
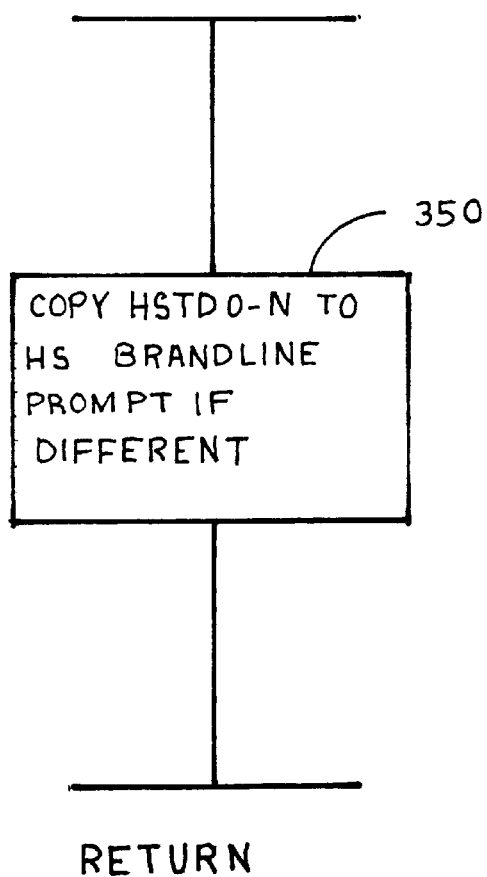
FIG. 12 is a flowchart depicting a message 3 algorithm handset according to the first embodiment of the invention.

Referring to FIG. 3, the handset EPROM 230 is programmed with blocks of instruction codes operable to direct the handset microprocessor 228 to execute respective functional blocks of a second initialization algorithm, a message 1 handling algorithm, and a message 3 handling algorithm described by flowcharts shown in FIGS. 5, 10 and 12 respectively. Specific codes stored in the handset EPROM 230 to implement these algorithms will also be ascertainable by one of ordinary skill in the art, with reference to a list of codes and associated functionality specific to the handset microprocessor 228. In this embodiment, the handset microprocessor 228 is the same as the base microprocessor 28.

Referring to FIGS. 2 and 13, it will be assumed that at the time of manufacture, the base startup channel buffer 70 is pre-programmed with the value "18" to indicate that channel 18 is to be used as an initial or default channel for communications with the handset and the base security ID buffer 72 is programmed with the value "1" to indicate that the security code to be used in at least initial transmissions between the base and the handset is the number "1". In addition, it is assumed that the base brandline prompt buffer 74 is programmed with the ASCII character string "Hello".

Referring to FIG. 3, it will be assumed that at the time of manufacture, the handset startup channel buffer 270 in the handset EEPROM 234 is pre-programmed with the value "17" to indicate that channel 17 is to be used as an initial or default channel for communications with the base and the handset security ID buffer 272 is programmed with the value "2" to indicate that the security code to be used in transmissions between the base and the handset is the number "2". In addition, it is assumed that the handset brandline prompt buffer 274 is programmed with the ASCII character string "Goodbye". Thus, the non-volatile memory in the handset is pre-programmed with an initial preferred channel identifier identifying at least one channel in the channel set, a security ID and a power-up prompt.

First Initialization Algorithm

Figure 4:
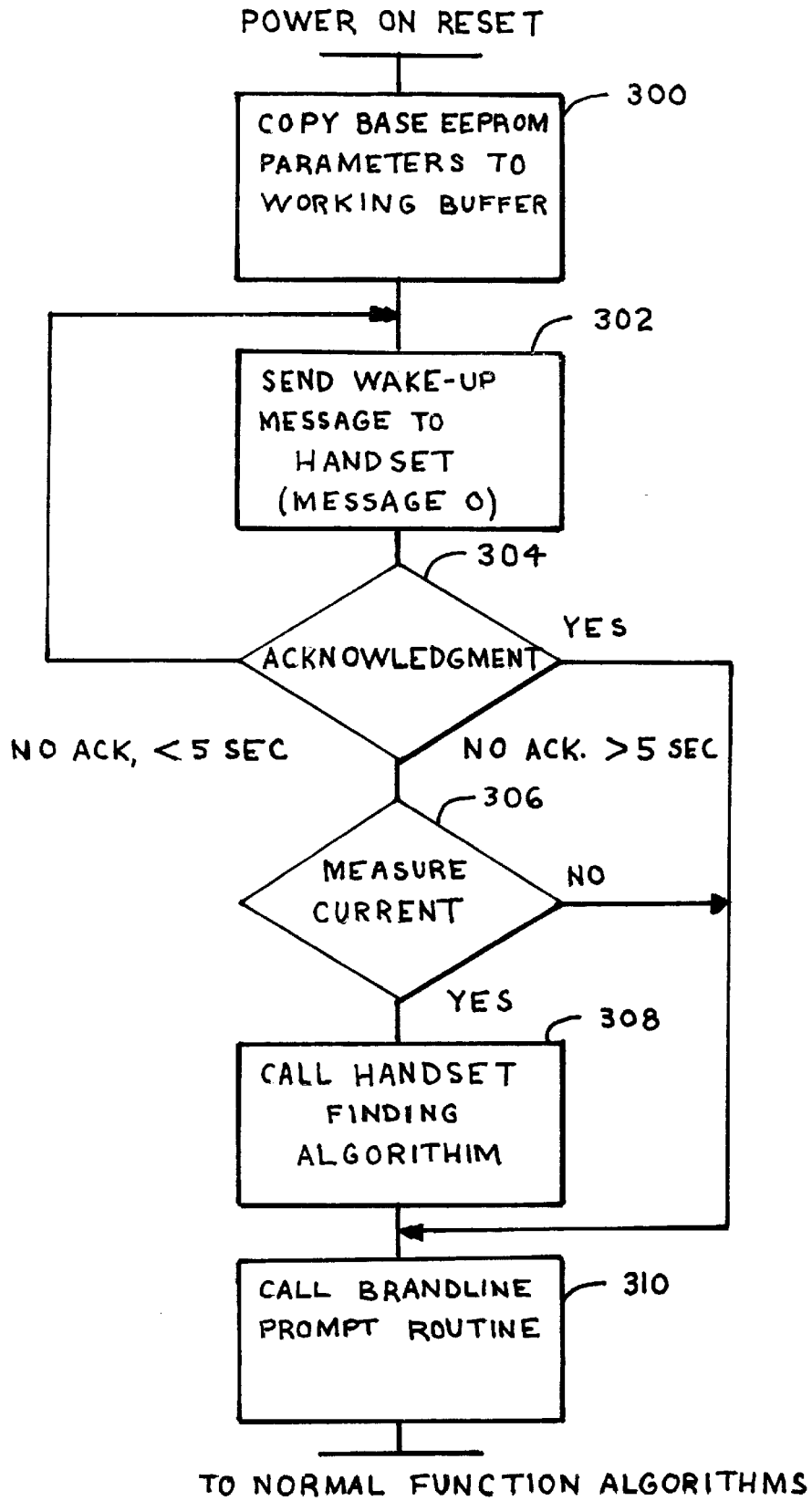
FIG. 4 is a flowchart depicting a first initialization algorithm base according to the first embodiment of the invention.

Referring to FIGS. 2 and 4, in response to the power on reset signal (50 in FIG. 2), the base microprocessor 28 is directed to the codes in the base EPROM 30 associated with the first initialization algorithm. The first initialization algorithm includes blocks 300–310. Block 300 directs the base microprocessor 28 to copy the contents of the base startup channel buffer 70 to the base working channel transmit and receive buffers 54 and 56 and to copy the contents of the base security ID buffer 72 to the base working channel security ID buffer 58. Thus, the base working channel transmit and receive buffers 54 and 56 are loaded with the value 18 and the base working channel security ID buffer 58 is loaded with the value "1". The value 18 therefore acts as a preferred channel identifier. The base is thus configured to transmit and receive on channel 18. The contents of the base RAM 32 and base EEPROM 34 buffers before and after block 300 are shown in FIG. 13 in columns A and B respectively.

Referring to FIGS. 3 and 5, the second initialization algorithm includes blocks 312–322. Block 312 directs the handset microprocessor to determine the state of the power on reset signal 250 from the handset power circuit 244 to determine whether or not the handset microprocessor 228 is being powered up for the first time. If the power on reset signal 250 is active, a power on reset flag is set in an associated buffer (not shown). Block 314 then directs the handset microprocessor 228 to copy the contents of the handset startup channel buffer 270 to the handset working channel transmit and receive buffers 254 and 256 and to copy the contents of the handset security ID buffer 272 to the handset working channel security ID buffer 258. The apparatus thus includes a working channel security buffer for holding a working channel security ID value. The contents of the handset RAM 232 and handset EEPROM buffers 270–274 before and after block 314 are shown in FIG. 13 in columns A and base respectively. Thus, the handset working channel transmit and receive buffers 254 and 256 are loaded with the value "17" and the handset working channel security ID buffer 258 is loaded with the value "2". The handset is thus configured to transmit and receive on channel 17.

Referring back to FIG. 4, Block 302 directs the base microprocessor to transmit a predefined wakeup message to the handset on the channel specified by the contents of the base working channel transmit buffer 54, ie., the preferred channel identifier. In this embodiment at this time, the wakeup message is therefore transmitted on channel 18.

The wakeup message will be referred to as message 0 and is compiled in the base transceiver buffers 60 by loading the base transceiver security ID buffer 62 with the contents of the base working channel security ID buffer 58, by loading the base transceiver message number buffer 64 with the value "0" to indicate that the message is to be identified as message 0, and by calculating and storing in the base transceiver CRC buffer 68 a CRC value for the collective contents of the base transceiver security ID buffer 62 and the base transceiver message number buffer 64. The contents of the base transceiver buffer 60 when the wakeup message is transmitted are shown in column C in FIG. 13.

Referring to FIGS. 3 and 5, block 316 directs the handset microprocessor 228 to wait for successful receipt of a transmission from the base on the channel specified by the contents of the handset working channel receive buffer 256, in this embodiment, at this time, channel 17. Since the base transmitted message 0 on channel 18, the message 0 transmission is not successfully received.

In the event that a transmission is successfully received, block 318 directs the handset microprocessor 228 to execute code implementing the message handling algorithm shown in FIG. 10 and subsequent block 320 directs the handset microprocessor 228 to transmit an acknowledgment signal to the base.

In the event that the message 0 transmission is not successfully received by the handset, block 320 which sends the acknowledgement signal is not reached, rather the handset microprocessor is directed by block 316 to continue to wait for successful receipt of a transmission from the base.

Referring back to FIG. 4, message 0 is repeatedly sent, while block 304 directs the base microprocessor to wait for the acknowledgement signal. The repeated sending of message 0 and waiting is carried out for a period of 5 seconds or until an acknowledgement signal is received. If the acknowledgement signal is not received within this period, the base microprocessor 28 continues processing at block 306. If the acknowledgement signal is received, the base microprocessor 28 is directed to block 310 which calls code implementing the brandline prompt algorithm shown in FIG. 9. Thus, the base microprocessor waits for a wakeup message acknowledgement signal from the handset and in response to the wakeup message acknowledgement signal, maintains in the base working channel transmit buffer the transmit channel indicator identifying the channel on which the wakeup message was transmitted to the handset.

Referring back to FIGS. 2 and 4, in this embodiment, at this time, the acknowledgement signal is not received and therefore block 306 directs the base microprocessor 28 to read the base I/O port 35 to determine whether or not the current detect signal 52 is active and to obtain from the base receiver circuit 42 a measurement of received signal strength. If the current detect signal 52 is active, block 308 calls code implementing the handset finding algorithm shown in FIG. 6.

Figure 6:
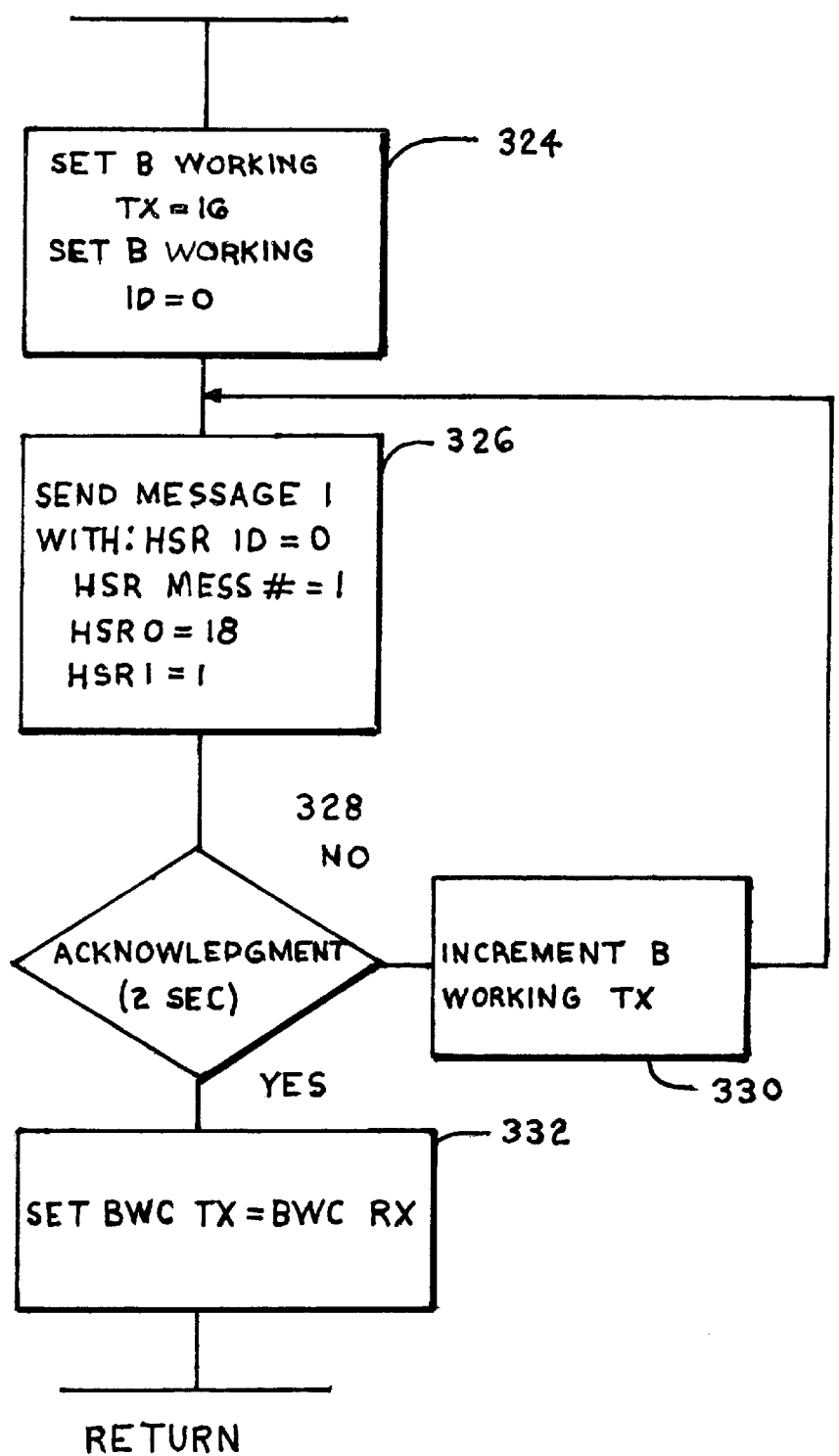
FIG. 6 is a flowchart depicting a handset finding algorithm base according to the first embodiment of the invention.

Referring to FIGS. 2 and 6, block 324 of the handset finding algorithm loads the base working channel transmit buffer 54 with the value 16 as 16 is the first channel number in a set of initial channel numbers which can be used to establish a call without first monitoring for activity. This set normally consists of channels 16–25. Block 324 also loads the contents of the base working channel security ID buffer 58 with a default value, which in this embodiment is "0". The contents of the base working channel receive buffer 56 remain the same (value 18).

Block 326 then loads the base transceiver security ID buffer 62 with the contents of the base working channel security ID buffer 58 (value 0), loads the base transceiver message number buffer 64 with the value "1" to indicate that message type "1" is to be transmitted, loads the base transceiver data 0 buffer 66 with the contents of the base working channel receive buffer 56 (value 18), loads the contents of the base transceiver data 1 buffer 66 with the contents of the base working channel security ID buffer 58 (value 1), and loads the CRC buffer 68 accordingly. The base microprocessor is thus programmed to produce a first new channel message with a preferred channel identifier, where message type 1 is the first new channel message and the preferred channel identifier is the contents of the base working channel receive buffer which currently are "18". It will be appreciated that the contents of the base working channel receive buffer are copied from the EEPROM which acts as non-volatile memory. Hence, the preferred channel identifier is stored in non-volatile memory. With the base transceiver buffer 60 so loaded, the base microprocessor 28 provides signals to the base I/O port 35 to cause the base I/O port 35 to provide signals to the base transmitter circuit 40 to transmit to the handset, on the channel (value 16) specified by the contents of the base working channel transmit buffer 54, the payload data defined by the base transceiver buffer 60. The message is thus transmitted by the base, on channel 16. The contents of the base and handset buffers at this time are shown in column D of FIG. 13. Thus, the transmitter is directed by the base microprocessor to transmit the first new channel message in the signals transmitted from the base to the handset, on a channel defined by the contents of the working channel transmit buffer.

Referring to FIGS. 3 and 5, since the contents of the handset working channel receive buffer (256) contain the value 17 channel 17 is specified as the receive channel. The transmission by the base on channel 16 is therefore not successfully received at the handset and therefore blocks 318 and 320 of the second initialization algorithm are not reached. Consequently, no acknowledgement signal is transmitted from the handset to the base and, referring back to FIG. 6, block 328 detects that no acknowledgement signal is received within a 2-second time period. In this case, block 330 increments the contents of the base working channel transmit buffer 54 and processing at the base microprocessor 28 continues back at block 326. The base working channel transmit buffer 54 is thus loaded with the value 17 at this time. Block 326 thus transmits the same message "1"11 to the handset, only this time it transmits it on channel 17. The contents of the base and handset buffers at this time are shown in column E of FIG. 13.

It will be appreciated that the handset processor is programmed to receive the first new channel message on a channel identified by the initial preferred channel identifier stored in the non-volatile memory, upon powering up the handset.

Referring back to FIGS. 3 and 5 since the base transmit channel is 17 and the handset receive channel is 17, the message is received by the handset receiver 242. Thus, the base microprocessor successively loads the base working channel transmit buffer with channel indicators corresponding to different channels within the channel set such that the first new channel message is successively transmitted on different channels.

As the message is received, it is stored in the handset transceiver buffers 260 such that respective portions of the message are stored in corresponding handset transceiver buffer locations including security ID 262, message number 264, Data 0–N 266 and CRC 268. The transceiver buffers 260 thus act as receive buffers for storing the first new channel message when that message is received and the receiver is operable to receive a security ID code in the first new channel message. The contents of the handset transceiver buffers 260 are shown in column F in FIG. 13. Successful receipt of the message is deemed to occur when the contents of the handset transceiver CRC buffer 268 match a CRC value calculated by the handset microprocessor 228 from the contents of the preceding portions of the handset transceiver buffer 260. Thus the handset receiver receives a first new channel message including a preferred channel identifier, on at least one channel in the channel set.

The handset microprocessor then continues processing at block 318 in FIG. 5, which calls code implementing the message handling algorithm shown in FIG. 10. The message handling algorithm is implemented by blocks 323, 325, 327, 329, 331, 333, 334 and 336. Block 323 directs the handset microprocessor 228 to read the security ID buffer 262. Block 325 then directs the handset microprocessor 228 to determine whether or not the contents of the security ID buffer are zero or are equal to the contents of the handset security ID buffer 272. If either of these conditions is satisfied, block 327 directs the handset microprocessor 228 to read the value provided by the voltage measurement circuit 78, through the handset I/O port 235. The voltage measurement circuit thus acts as an in-cradle sensor for sensing whether or not the handset is in the cradle.

Block 329 then directs the handset microprocessor 228 to compare the voltage measurement value with a reference value to determine whether or not the measured value exceeds the reference value. If so, then the handset 14 is presumed to be in the cradle 16 and the handset microprocessor 228 is directed to block 331.

Block 331 directs the handset microprocessor 228 to determine the signal strength of the signal received at the receiver 242. Thus the receiver provides to the microprocessor a signal indicating signal strength of the signal received from the base. Block 333 then directs the microprocessor to determine whether or not the signal strength exceeds a pre-defined signal strength and if so, the handset 14 is presumed to be very close to the base 12. Block 334 directs the handset microprocessor 228 to copy the contents of the handset receive data buffer 0 266 to the handset working channel transmit buffer 254 and handset working channel receive buffer 256 and to re-program the handset EEPROM 234 handset startup channel buffer 270 with the contents of the handset working channel receive buffer 256. The handset processor is thus programmed to copy the preferred channel identifier from the receive buffer to the handset working channel transmit buffer, to the handset working channel receive buffer and to the non-volatile memory. Thus, the working channel security ID value is stored in non-volatile memory and the handset working channel transmit and receive buffers 254 and 256 and the handset startup channel buffer 270 are loaded with the value 18. The receiver is thus directed to conduct subsequent communications with the base on a channel identified by the preferred channel identifier.

Thus, when the handset is in the cradle and the signal strength is greater than a pre-defined value, contents of the working channel security ID buffer are replaced with the security ID code in the first new channel message when the security ID code in the message is equal to the default value.

Block 336 then directs the handset microprocessor 228 to copy the contents of handset receive channel buffer 1 266 to the handset working channel security ID buffer 258 and to the handset EEPROM 234 handset security ID buffer 272. Thus, the handset working channel security ID buffer 258 and the handset EEPROM 234 handset security ID buffer 272 are loaded with the value 1. The message handling routine of FIG. 10 is thus completed. The contents of the buffers in the handset after the message handling routine is completed are shown in column G in FIG. 12. Completion of the message handling routine redirects the handset microprocessor to block 320 of the second initialization algorithm shown in FIG. 5.

If at block 325 the contents of the security ID buffer 262 are not zero or are not equal to the contents of the handset security ID buffer 272, or, if at block 329 the handset is determined not to be in the cradle or at block 333 the handset is determined not to be near the base, the message-1 handling algorithm is terminated and the contents of the message are not copied to the buffers. Thus, the handset processor is operable to compare the security ID code with a default value and the contents of the working channel security ID buffer and if the security ID code is not equal to the default value or the contents of the working channel security ID buffer, the transmission of the acknowledgement signal to the base is disabled.

Referring back to FIG. 5, block 320 directs the handset microprocessor 228 to cause the handset transmitter 240 to transmit the acknowledgement signal to the base on the channel specified by the contents of the handset working channel transmit buffer 254. Thus, the handset processor is programmed to direct the transmitter to transmit to the base an acknowledgement signal in response to receiving the first new channel message. Hence, the acknowledgement signal is transmitted back to the base on channel 18, and since the base working receive channel at this time is also 18, the base receiver circuit 42 shown in FIG. 2 receives the acknowledgement signal and communicates it to the base microprocessor 28. Thus, the base microprocessor receives an acknowledgement signal from the base receiver when an acknowledgement signal is received from the handset. The contents of the buffers in the base and in the handset at this point are shown in column H of FIG. 13. (It should be noted that the contents of the buffers indicated in column G are the same as the contents of the buffers indicated in column H).

Analysis of FIG. 10 will indicate that by programming the handset to respond to a message received on a cooperating receive channel when the security ID is equal to a default value, in this embodiment zero, allows the handset to receive signals from the base when only the base transmit and handset receive channels match. This simplifies the handset finding procedure as it permits initial communication with a minimal level of security and increases such security after initial contact by requiring that all further communications be conducted with the appropriate security code, as transmitted in the message. Thus, during normal communications the initially transmitted security code is used to ensure other communications on the same channel such as by other cordless telephones in the vicinity will be ignored. The default value, in this embodiment zero, therefore acts as a wildcard value which allows a message to be communicated to the handset no matter what the stored handset security ID code.

In addition, measurement of the received signal strength allows the handset to distinguish between the signal from the base with which it is associated when it is in the cradle of such base, and a signal from a nearby base such as may be provided by a neighbour's cordless telephone in an adjacent apartment. By only permitting the message to be received and used to configure the handset when the handset is very near the base, the probability that any other base will have the ability to re-configure the handset is reduced.

Referring back to FIG. 6, successful receipt of the acknowledgment signal causes the base microprocessor 28 to execute block 332 which directs the base microprocessor 28 to copy the contents of the base working channel receive buffer 56 to the base working channel transmit buffer 54. Thus the value "18" is copied from the base working channel receive buffer 56 to the base working channel transmit buffer 54. In addition, in response to the acknowledgement signal from the receiver, the base microprocessor maintains in the base working channel transmit buffer 54 a channel indicator associated with the last channel on which the first new channel message was transmitted immediately before the acknowledgment signal was received such that further communications between the base and the handset are conducted on the last channel. The contents of the base and handset buffers after block 332 are shown in column I in FIG. 13.

It will be appreciated that the handset finding algorithm and hence the step of successively loading the base working channel transmit buffer occurs only when the charge current signal is active, or in other words, only when the handset is in the cradle.

Referring back to FIG. 5, at the handset, after the acknowledgement signal has been transmitted to the base, block 322 determines whether or not the power-up reset flag has been set and if so, directs the handset microprocessor 228 to load into the handset transceiver buffers 260 and transmit to the base a second type of message (message type 2). The contents of the buffers in the base and in the handset just before the type 2 message is transmitted are shown in column J in FIG. 13.

After the message type 2 is transmitted, the power-up reset flag is reset to inactive and the handset microprocessor 228 is directed to continue processing back at block 316 which directs the handset microprocessor 228 to wait for a successful transmission from the base. The contents of the base and handset buffers after the message type 2 is transmitted are shown in column K in FIG. 13.

Figure 7:
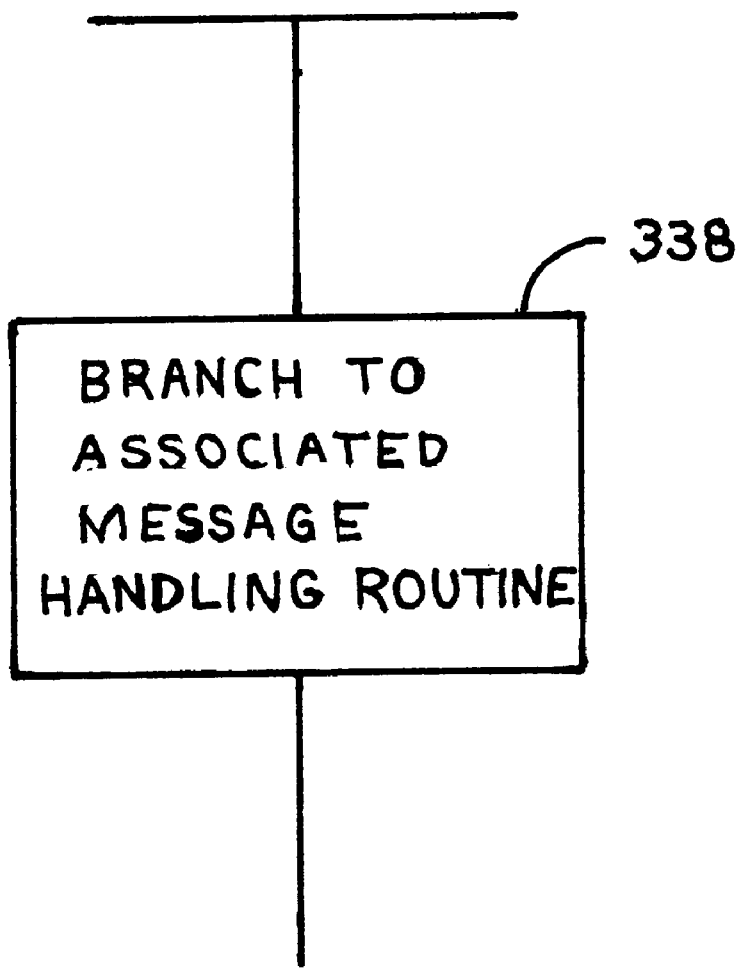
FIG. 7 is a flowchart depicting a receive algorithm base according to the first embodiment of the invention.

Referring to FIGS. 2 and 7, upon receipt of a message type 2 transmission from the handset, at the base, the base microprocessor 28 receives an interrupt signal from the base receiver circuit 42, which re-directs the base microprocessor 28 circuit to code implementing the handset message handling routine shown in FIG. 12. This routine includes block 338 which determines the message type by reading the contents of the base transceiver message number buffer 64 and calls code implementing a suitable handling algorithm associated with the message type indicated.

Figure 8:
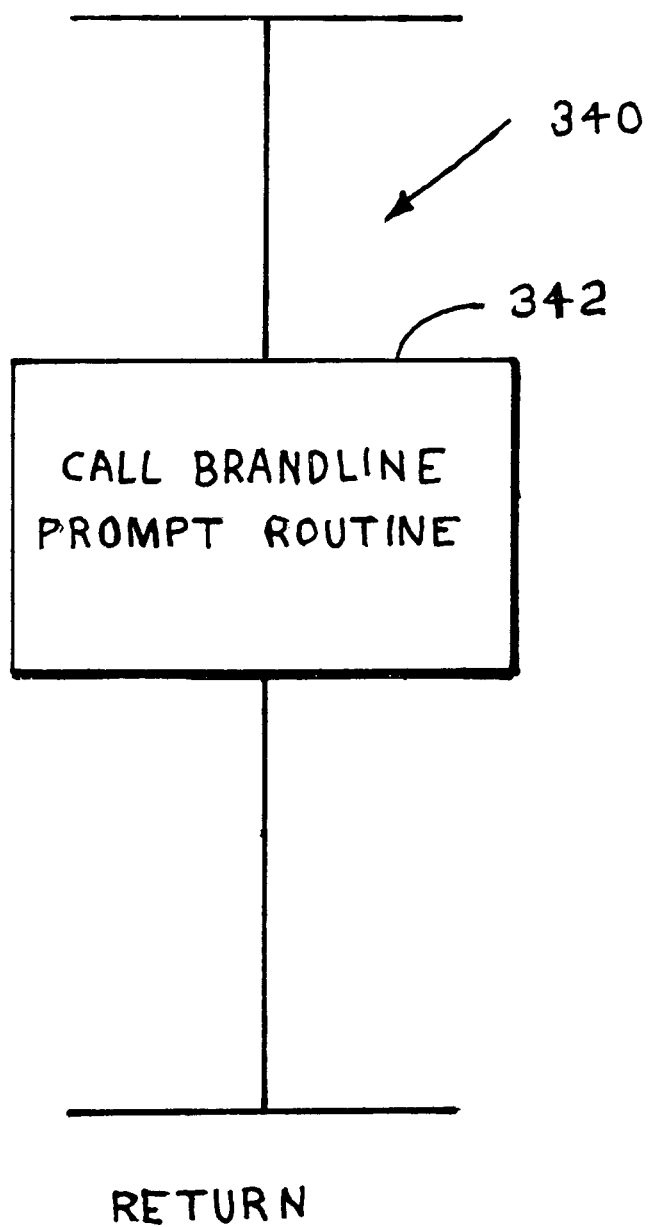
FIG. 8 is a flowchart depicting a message 2 handling algorithm base according to the first embodiment of the invention.
Figure 9:
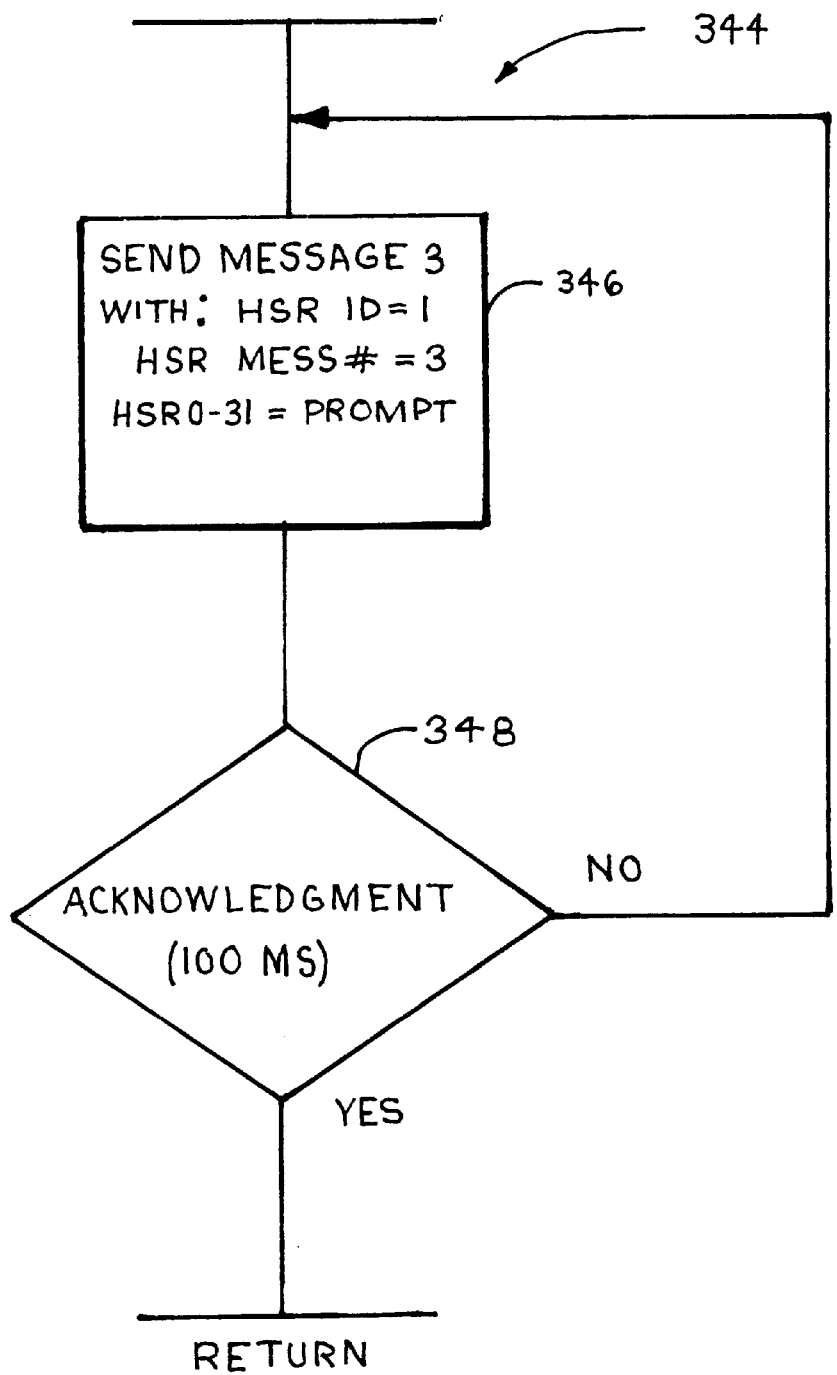
FIG. 9 is a flowchart depicting a brandline prompt algorithm base according to the first embodiment of the invention.

Referring to FIG. 8, a message 2 handling algorithm is shown generally at 340 and includes block 342 which calls code implementing the brandline prompt algorithm shown at 344 in FIG. 9.

Referring to FIGS. 2 and 9, the brandline prompt algorithm is implemented by a first block 346 which directs the base microprocessor 28 to send to the handset a third type of message (message type 3). This is accomplished by loading the base transceiver security ID buffer 62 with the contents of the base working channel security ID buffer 58 (value 1), loading the transceiver message number buffer 64 with the value "3", loading the base transceiver data 0–N buffers 66 with the base brandline prompt from buffer 74 in non-volatile memory (EEPROM 34) and calculating and loading the base transceiver CRC buffer 68 with the appropriate CRC value and by directing the base microprocessor 28 to cause the base transmitter circuit 40 to transmit the contents of the base transceiver buffer 60 to the handset. The contents of the base transceiver buffer 60 just before the message is sent to handset are shown in column L in FIG. 14. After the message has been transmitted, block 348 directs the base microprocessor 28 to wait about 100 milliseconds for an acknowledgement signal from the handset. If an acknowledgment signal is not received, the message is sent again.

Referring to FIG. 3, the handset receiver 242 receives the message type 3 transmission from the base and indicates to the handset microprocessor 228 that a successful transmission has been received from the base.

Referring to FIGS. 3 and 5, upon receipt of an indication of a successful transmission at block 316, the handset microprocessor 228 is directed to block 318 which calls code implementing the type three message handling algorithm shown in FIG. 12. Referring to FIG. 12, this code includes block 350 which directs the handset microprocessor 228 to compare the contents of handset transceiver buffers 0–N 260 to the handset brandline prompt buffer 274 in the handset EEPROM 234. If they are different, the contents of handset transceiver buffers 0–N 260 are copied to the handset brandline prompt buffer 274, otherwise the processor is directed back to block 230 in FIG. 5. The contents of the base and handset buffer upon completion of block 350 are shown in column M in FIG. 14. Upon completion of block 350, the handset microprocessor 228 is directed back to block 320 in FIG. 5 which sends the acknowledgement signal back to the base. Processing then continues with block 322 which determines that the power-up reset flag is not set and therefore the handset microprocessor 228 is directed back to block 316 to wait for any further transmissions from the base.

Referring back to FIG. 9, upon receipt of the acknowledgement signal at the base as determined at block 348, the brandline prompt routine is completed and processing returns to the message 2 handling routine 340 of FIG. 8, which further returns processing to code implementing the receive algorithm shown in FIG. 7 which further returns processing to block 310 of the first initialization routine shown in FIG. 4.

Block 310 of FIG. 4 again calls the code implementing the brandline prompt algorithm shown at 344 in FIG. 9 and the message type 3 is again sent to the handset in the manner described above. Upon completion of this second pass through the code implementing brandline prompt algorithm, processing is returned to the code implementing the first initialization routine shown in FIG. 4, which terminates and directs the base microprocessor 28 to continue processing with normal, conventional functional algorithms for controlling the telephone such as audio handling, ring detect, etc. The handset microprocessor 228 also is operable to execute normal conventional functional algorithms, while waiting for any further transmissions from the base.

It will be appreciated that upon initial activation of the base and handset, the brandline prompt routine is run twice. This is a consequence of yes and no paths from blocks 304 and 306 in FIG. 4, respectively, which ensure the code implementing the brandline prompt routine (344 in FIG. 9) is run even when the handset finding algorithm shown in FIG. 6 is not being run. This would occur in a case where the working channel transmit and receive buffers 254 and 256 are already programmed with values corresponding to the transmit and receive channel numbers stored in the base working channel transmit and receive buffers 54 and 56 of the base and the power on reset flags at both the base and the handset are active; that is, both the base and the handset have had their power removed, then re-applied.

To summarize therefore, the base processor is programmed to transmit to the handset a prompt message including a prompt code associated with a prompt to be displayed on the handset for viewing by the user.

A further feature of the apparatus is the ability to perform an in-cradle scan of the set of initial channels to determine which of said channels has the least amount of background noise and to automatically re-program the base and handset to operate on such channel.

Figure 11:
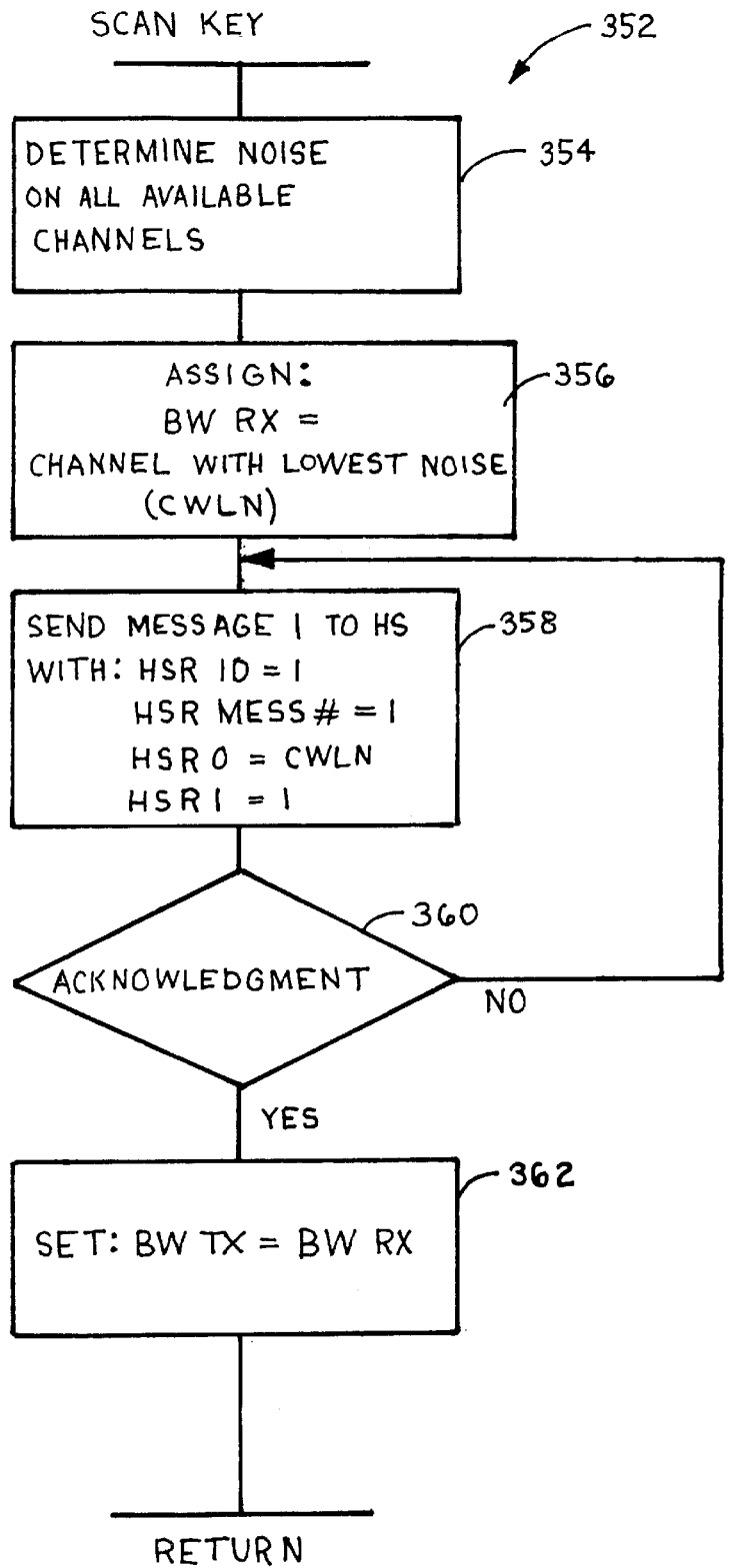
FIG. 11 is a flowchart depicting an in-cradle scan algorithm base according to the first embodiment of the invention.

Referring to FIGS. 2 and 11, the in-cradle scan algorithm is shown generally at 352. The algorithm is implemented by blocks 354–362 of code which direct the base microprocessor 28 to perform functional blocks of the algorithm. Immediately prior to running the scan algorithm, the base and handset buffers are assumed to contain values as indicated in column N in FIG. 15.

Block 354 is the first block of the algorithm and directs the base microprocessor 28 to successively measure the background or ambient noise on each channel to determine respective numbers representing the amplitude of the background noise measured on each channel 16–25. This is accomplished by successively incrementing the contents of the base working channel receive buffer 56 starting with channel 16 and determining a measured noise value for each channel by reading the output of the receiver through the base I/O port 35 and associating the measured noise values with respective channels. The contents of the base and handset buffers during this scanning process are shown in column O in FIG. 15. The receiver is thus operable to measure noise on each channel of the channel set and provide to the base processor an indication of measured noise on each channel.

Also at block 354 the base microprocessor 28 is directed to determine which of the measured values represents the least amount of noise and to determine which channel is associated with the value representing the least amount of noise. Thus, the base processor is programmed to receive an indication of measured noise on each channel and to Identify the channel having the least measured noise.

Upon establishing which channel is associated with the least amount of noise, block 356 directs the base microprocessor 28 to load the base working channel receive buffer 56 with the number of such channel. In this embodiment the channel with the least amount of noise is determined to be channel 23 and therefore "23" is loaded into the base working channel receive buffer 56. The contents of the base and handset buffers upon completion of block 356 are shown in column P in FIG. 13.

Block 358 then directs the base microprocessor 28 to transmit a message type 1 to the handset as described above, except with the base transceiver buffer 60 containing the value "23". The contents of the base and handset buffers just before the message is transmitted are shown in column Q in FIG. 15.

The message type 1 is received by the handset as described above with reference to FIGS. 5 and 10. Upon entry into the code implementing the message 1 handling algorithm shown in FIG. 10, the contents of the base and handset buffers are as shown in column R in FIG. 13. Upon completion of the message 1 handling routine, the handset working channel transmit and receive buffers 254 and 256 are loaded with the value "23", as shown in column S in FIG. 15. Thus, the base processor is programmed to direct the transmitter to transmit a second new channel message from the base to the handset, the second new channel message including a second new channel identifier identifying the channel with the least measured noise, such that further communications between the base and the handset are conducted on the channel with the least measured noise.

Referring back to FIG. 5, when, upon completion of the message handling routine of FIG. 10, block 320 directs the handset processor to cause the transmitter to transmit the acknowledgement signal, and the handset microprocessor 228 is directed back to block 316 which places the handset microprocessor 228 in a wait loop to wait for any further transmissions from the base.

The transmitted acknowledgement signal is received at block 360 of the in-cradle scan algorithm 352 shown in FIG. 11 and block 362 directs the base microprocessor 28 to copy the contents of the base working channel receive buffer 56 to the base working channel transmit buffer 54. In this embodiment, this results in the value "23" being copied from the base working channel receive buffer 56 to the base working channel transmit buffer 54. The contents of the base and handset buffers after block 362 has been executed are shown in column T in FIG. 15. The handset and base are thus configured to communicate on channel 23 as channel 23 has been found to have the least amount of measured noise.

With the present invention when a handset is manufactured, it may be left in a generic state where its EEPROM parameters ie., security ID, working channel values and prompt are set to pre-defined values which may not necessarily match those of the base. To match the handset to a base having a particular preferred radio channel and security ID, the handset may simply be placed in the base cradle and the base powered-up. The base will recognize that there is a handset in the cradle, but may not be able to communicate with it. The base therefore attempts to communicate with the handset on a plurality of channels, using a wildcard security ID. When communications have been established, the base transfers new communications parameters to the handset and the handset re-programs itself by loading the new communications parameters into its own EEPROM. The handset and base then are a matched set. This eliminates the need to match up handsets to bases during production and allows customers to purchase just a new handset or just a new base in the event that a replacement is required. In addition, the use of the brandline prompt makes practical the use of customized prompts for relatively small production runs.

The ability to re-scan the available channels to locate the one with the least amount of noise saves a user from successively pressing a new channel button on the telephone to locate a "good" channel. The noise on each channel is measured and quantified and the microprocessor automatically determines the channel with the least noise without further attention or interaction of the user. Thus, the user need not attempt to compare noise on each channel to select the best one to use.

While specific embodiments of the invention have been described and illustrated, such embodiments should be considered illustrative of the invention only and not as limiting the invention as construed in accordance with the accompanying claims.

What is claimed is:

1. A base apparatus in a cordless telephone for communicating with a handset of said cordless telephone on at least one communications channel within a channel set, the base apparatus comprising:
   a) a receiver for receiving signals from said handset;
   b) a transmitter for transmitting signals from said base to said handset;
   c) a base working channel transmit buffer for storing a transmit channel indicator defining a channel on which said transmitter transmits said signal;
   d) a base processor in communication with said receiver, said transmitter and said base working channel transmit buffer, said base processor being programmed to:
      i) produce a first new channel message including a preferred channel identifier;
      ii) direct said transmitter to transmit said first new channel message in said signals transmitted from said base to said handset, on a channel defined by the contents of said base working channel transmit buffer;
      iii) successively load said base working channel transmit buffer with channel indicators corresponding to different channels within said channel set such that said first new channel message is successively transmitted on different channels;
      iv) receive an acknowledgement signal from said receiver when an acknowledgement signal is received from said handset; and
      v) in response to said acknowledgement signal from said receiver, maintain in said base working channel transmit buffer a channel indicator associated with a last channel on which said message was transmitted immediately before said acknowledgment signal was received such that further communications between said base and said handset are conducted on said last channel.

2. A base apparatus as claimed in claim 1 wherein said base apparatus has a connector for supplying a charge current to said handset and wherein said base apparatus further includes a current sensor for measuring said charge current and for providing to said base processor a current detect signal which is rendered active when said charge current exceeds a pre-defined value.

3. A base apparatus as claimed in claim 2 wherein said base processor is programmed to perform the step of successively loading said base working channel transmit buffer when said current detect signal is active.

4. A base apparatus as claimed in claim 1 further comprising non-volatile memory for storing said preferred channel identifier.

5. A base apparatus as claimed in claim 4 further comprising a power-up detection circuit for detecting and indicating to said base processor a power-up condition of said base.

6. A base apparatus as claimed in claim 5 further comprising a base working channel receive buffer and wherein said base processor is programmed to copy said preferred channel identifier from said non-volatile memory to said base working channel transmit buffer and said base working channel receive buffer in response to said power-up condition.

7. A base apparatus as claimed in claim 1 wherein said base processor is programmed to transmit to said handset a prompt message including a prompt code associated with a prompt to be displayed on said handset for viewing by the user.

8. A base apparatus as claimed in claim 7 further comprising non-volatile memory for storing said prompt code.

9. A base apparatus as claimed in claim 7 wherein said base processor is programmed to:
   a) direct said transmitter to transmit a wakeup message to said handset on a communications channel identified by said preferred channel identifier, prior to transmitting said first new channel message; and
   b) wait for a wakeup message acknowledgement signal from said handset and in response to said wakeup message acknowledgement signal, to maintain in said base working channel transmit buffer said transmit channel indicator identifying the channel on which said wakeup message was transmitted to said handset.

10. A base apparatus as claimed in claim 1 wherein said receiver is operable to measure noise on each channel of said channel set and provide to said base processor an indication of measured noise on each channel.

11. A base apparatus as claimed in claim 10 wherein said base processor is programmed to receive said indication of measured noise on each channel and to identify the channel having the least measured noise.

12. A base apparatus as claimed in claim 11 wherein said base processor is programmed to direct said transmitter to transmit a second new channel message from said base to said handset, said second new channel message including a second new channel identifier identifying said channel with the least measured noise, such that further communications between said base and said handset are conducted on said channel with the least measured noise.

13. A method of controlling communications between a base and a handset capable of communicating with each other on at least one communications channel within a channel set, the method comprising:
   a) in response to at least one of a power up signal and channel noise measurement, transmitting from said base to said handset, a first new channel message including a preferred channel identifier, on different channels of said channel set until an acknowledgement signal is received from said handset;
   b) in response to said acknowledgement signal, storing in a base working channel transmit buffer, said preferred channel identifier; and
   c) conducting further communications between said base and said handset on a communications channel identified by said preferred channel identifier.

14. A method as claimed in claim 13 further comprising determining whether or not said handset is connected to said base and performing the steps of claim 13 when said handset is connected to said base.

15. A method as claimed in claim 14 further comprising measuring electric current flow from said base to said handset and when said current flow exceeds a pre-defined value, rendering active a signal indicating said handset is connected to said base.

16. A method as claimed in claim 13 further comprising storing said preferred channel identifier in non-volatile memory in said base.

17. A method as claimed in claim 16 further comprising detecting a power-up condition of said base and copying said preferred channel identifier from said non-volatile memory to a base working channel transmit buffer and a base working channel receive buffer.

18. A method as claimed in claim 17 further comprising transmitting to said handset a prompt message including a prompt code associated with a prompt to be displayed on said handset for viewing by the user.

19. A method as claimed in claim 18 further comprising receiving said prompt message at said handset and displaying said prompt associated with said prompt code for viewing by said user.

20. A method as claimed in claim 19 further comprising storing said prompt code in non-volatile memory in said handset.

21. A method as claimed in claim 19 further comprising storing said prompt code in non-volatile memory in said base.

22. A method as claimed in claim 18 further comprising:
   a) transmitting from said base, a wakeup message on a communications channel identified by said preferred channel identifier;
   b) waiting for a wakeup message acknowledgement signal from said handset; and
   c) in response to said wakeup message acknowledgement signal, omitting the step of transmitting from said base to said handset said first new channel message including a preferred channel identifier, on different channels of said channel set.

23. A method as claimed in claim 13 further comprising receiving at said handset said first new channel message on at least one of said communications channels within said channel set.

24. A method as claimed in claim 23 further comprising when said first new channel message is successfully received at said handset, configuring said handset to use said channel identified by said preferred channel identifier for communications between said handset and said base.

25. A method as claimed in claim 24 further comprising storing said preferred channel identifier in non-volatile memory in said handset.

26. A method as claimed in claim 25 further comprising storing said first new channel message in a receive buffer.

27. A method as claimed in claim 26 further comprising copying said preferred channel identifier from said receive buffer to a handset working channel transmit buffer and to a handset working channel receive buffer and transmitting and receiving all messages from said base on a channel specified by the contents of said handset working channel transmit buffer and said handset working channel receive buffer respectively.

28. A method as claimed in claim 25 further comprising transmitting said acknowledgement signal on said communications channel identified by said preferred channel identifier when said first new channel message is successfully received by said handset.

29. A method as claimed in claim 18 wherein said receiver is operable to receive a security ID code in said first new channel message.

30. A method as claimed in claim 29 further comprising holding a working channel security ID value in a working channel security buffer.

31. A method as claimed in claim 30 further comprising storing said working channel security ID value in non-volatile memory.

32. A method as claimed in claim 30 further comprising replacing the contents of said working channel security ID buffer with said security ID code in said first new channel message when said security ID code in said message is equal to said default value.

33. A method as claimed in claim 32 further comprising sensing whether or not said handset is in said cradle.

34. A method as claimed in claim 33 wherein the handset processor is programmed to replace the contents of said working channel security ID buffer when said handset is in said cradle.

35. A method as claimed in claim 34 further comprising receiving a charging current from said base at charging terminals of said handset and sensing voltage across said charging terminals.

36. A method as claimed in claim 35 further comprising providing to said processor a signal indicating signal strength of the signal received from the base.

37. A method as claimed in claim 36 further comprising replacing the contents of said working channel security ID buffer when said signal strength is greater than a pre-defined value.

38. A method as claimed in claim 29 further comprising comparing said security ID code with a default value and the contents of said working channel security ID buffer and if said security ID code is not equal to said default value or said contents of said working channel security ID buffer, disabling the transmission of said acknowledgement signal to said base.

* * * * *